United States Patent [19]
Crooks et al.

[11] 4,327,256
[45] Apr. 27, 1982

[54] TELEPHONE SYSTEM

[75] Inventors: Stephen J. Crooks, North Yorkshire; Robert A. Stevenson, Durham, both of England

[73] Assignee: The General Electric Company Limited, London, England

[21] Appl. No.: 144,970

[22] Filed: Apr. 29, 1980

[30] Foreign Application Priority Data

May 4, 1979 [GB] United Kingdom ............... 15676/79

[51] Int. Cl.³ .............................................. H04Q 5/20
[52] U.S. Cl. .............................. 179/99 R; 179/99 M; 179/18 FA
[58] Field of Search .............. 179/99 R, 99 A, 99 LC, 179/99 H, 18 J, 99 M, 18 FA

[56] References Cited

U.S. PATENT DOCUMENTS

| | | | |
|---|---|---|---|
| 3,789,152 | 1/1974 | Medill et al. | 179/99 M |
| 3,914,559 | 10/1975 | Knollman | 179/99 LC |
| 3,996,424 | 12/1976 | Agricola | 179/18 J |
| 4,088,844 | 5/1978 | Kinnaird, Jr. et al. | 179/99 R |
| 4,088,846 | 5/1978 | McEowen | 179/99 A |
| 4,125,748 | 11/1978 | Nahabedian et al. | 179/99 R |
| 4,160,131 | 7/1979 | Kaul et al. | 179/99 M |
| 4,220,827 | 9/1980 | Burke et al. | 179/99 LC |

FOREIGN PATENT DOCUMENTS 1464615 2/1977 United Kingdom ............. 179/99 R

OTHER PUBLICATIONS

"Novakey Data Controlled Key System", F. J. Howett, *Electrical Communication*, vol. 52, No. 4, 1977, pp. 293-298.

*Primary Examiner*—Gerald L. Brigance
*Attorney, Agent, or Firm*—Kirschstein, Kirschstein, Ottinger & Cobrin

[57] ABSTRACT

An electronic key telephone system in which three or more key telephone instruments are interconnected or connected to an exchange line, as required, by way of a central control unit, each instrument being connected to the central unit by means of two speech wires and two signalling and control wires, an adaptor unit is provided to enable connection of an external extension telephone to the central unit by way of a single pair of wires.

6 Claims, 1 Drawing Figure

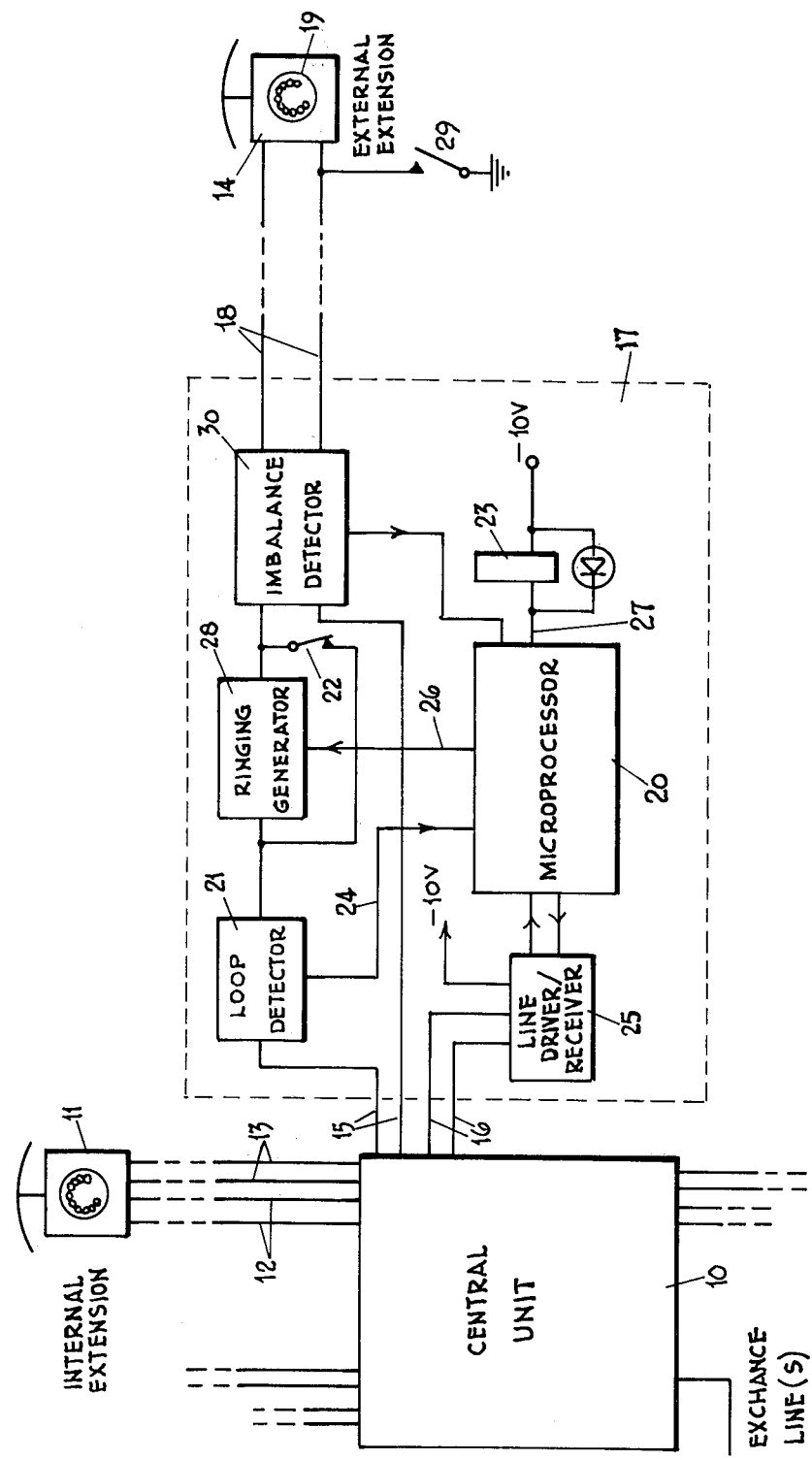

TELEPHONE SYSTEM

This invention relates to telephone systems and is more particularly concerned with telephone systems of the kind which has at least three telephone instruments and provision for speech connections to be set up automatically by operation of manually-operable controls associated with the telephone instruments between any one of three instruments and selectively either another of said instruments or a line to a remote exchange.

Telephone systems of the kind specified have previously been proposed but hitherto they have involved a relatively large number of wires to each telephone instrument. One object of the present invention is to provide a system involving a lesser number of wires.

According to the present invention, in a telephone system of the kind specified comprising a central unit to which said telephone instruments are connected each by only a respective first pair of wires for carrying two-way speech signals and a respective second pair of wires for carrying control and indicating signals between the central unit and the telephone instrument, the central unit being arranged to operate in response to control signals received over the second pair of wires to connect the first pair of wires to any one of the telephone instruments selectively to either an intercom highway or to an exchange line, to enable a further telephone instrument to be connected into the system over a single pair of wires but, at least for some facilities of the system, to emulate a telephone instrument having two pairs of connecting wires as aforesaid, an adaptor unit is connected between the single pair of wires which are terminated by the further telephone instrument and first and second pairs of conductors which are connected to the control unit, said first and second pairs of conductors being arranged respectively to carry speech signals and control signals and the adaptor unit comprising loop detection means to supply an off-hook control signal to the second pair of conductors in response to the single pair of wires being looped when the further telephone instrument is off-hook and means to supply a calling signal to the single pair of wires in response to the central unit supplying a signal over the second pair of conductors to signify that the further telephone instrument is to be called.

The system may have more than one intercom highway and it will be appreciated that a required speech connection between any two of the telephone instruments is set up when those instruments are connected to the same intercom highway.

Preferably the central unit is arranged to feed electric power to the telephone instruments via the respective first pairs of wires for the purpose of powering those instruments.

Each telephone instrument may have a calling device (e.g. a buzzer) which responds to a control signal supplied by the central unit in response to the central unit supplying a signal over the second pair of conductors to signify that the further telephone instrument is to be called.

One example of a telephone system in accordance with the present invention will now be described. The system has four telephone instruments and is arranged to enable speech connections to be set up selectively either between the telephone instruments or between the telephone instruments and two lines to a remote telephone exchange.

In addition to said telephone instruments, the system also includes a central unit to which each telephone instrument is connected by only two pairs of wires. One of these pairs is utilised for carrying two-way speech signals and calling signals (e.g. "dial" impulses or MF tone signals) from the telephone instrument and for feeding DC power from the central unit to the telephone instrument to power the circuitry of that instrument. The other pair of wires is used for two-way signalling between the telephone instrument and the central unit, this signalling being in digital form.

Each of the telephone instruments is basically of conventional form in that it includes a telephone handset, an "off-hook" gravity switch which is operated when the handset is removed from its rest, a calling buzzer and either a rotary dial or a key pad to enable signals to be generated under the control of the user to characterise the identity of a called party. In addition each telephone instrument has six manually operable self-locking keys, a "hold" button and seven indicator lamps (preferably light-emitting diodes). Two of said keys subsequently termed "line keys", are operated when the telephone instrument is to be connected to one or other of the two exchange lines, while a further three of the keys, subsequently termed "extension keys", are operated respectively to connect the instrument in question to the other three telephone instruments of the system. The remaining key is a "divert" key the significance of which will subsequently be explained.

Two of said indicator lamps of each telephone instrument are arranged to indicate the status (i.e. engaged or free) of the two exchange lines respectively while three further lamps indicate the status (i.e. whether or not off-hook) of the other three telephone instruments. The remaining two lamps indicate the diversion status of the extension.

The central unit includes a microprocessor which controls the operation of that unit. More particularly the microprocessor causes an eight bit "word" to be transmitted over the appropriate pair of control wires to each of the telephone instruments in turn. The eight bits of successive words transmitted to each telephone instrument constitute eight different signalling channels to that instrument, these channels being utilised for the purpose of controlling the seven indicator lamps and the buzzer. Each telephone instrument receives a word signalled in this way from the central unit about once every 50 milliseconds (depending upon the other operations performed by the microprocessors during that period).

In response to receiving a word as described in the last paragraph, each telephone instrument is arranged to transmit an eight bit "word" to the central unit over the pair of control wires connected to that instrument. Thus, shortly after a telephone instrument receives a word, a reply word is sent to the central unit. The eight bits of each reply word again provide eight signalling channels over which is passed the state of the seven keys (i.e. operated or released) and of the gravity switch.

The manner in which the system is used in various circumstances will now be considered more fully:

Incoming Exchange Line Call

A ringing detector in the central unit responds to a ringing signal on the appropriate exchange line, say Line 1, and passes a signal to the microprocessor which causes signals to be sent over the control wires to all the telephone instruments. The latter signals cause the "Line 1" lamps of all the telephone instruments to flash at a calling frequency and operate the buzzers of all the telephone instruments which are on-hook and not subject to a divert (as subsequently explained). The user of one of the last-mentioned telephone instruments accepts the call by going off-hook and pressing the "Line 1" key of his instrument. That information is signalled to the central unit which then (1) interrupts the signals to operate the buzzers, (2) supplies signals to light continuously the "Line 1" lamps of all the instruments (to signify that Line 1 is engaged) and (3) operates relays of a matrix of electromagnetic relays to connect the speech wires of the appropriate telephone instrument to Line 1.

Outgoing Exchange Line Call

When the user of one of the telephone instruments wishes to initiate a call via an exchange line, he lifts the handset off-hook and that condition is signalled to the microprocessor. He then presses the line key of a line not then in use and the microprocessor responds by operating relays of said matrix to connect the speech wires of the instrument in question to the selected exchange line and to light the appropriate line lamps of all the telephone instruments. Thereafter the user operates his dial or keypad to signal the identity of the called party to the exchange in the usual way.

Intercom call between two telephone instruments

The user of a first telephone instrument lifts his handset and presses the relevant extension key to signify a request for connection to a second telephone instrument. This condition is recognised by the microprocessor which causes (1) the speech wires of the appropriate telephone instrument to be connected by way of said relay matrix to an intercom speech highway (via which the direct current required to operate the telephone instrument is supplied) and (2) supplies signals to the second telephone instrument (assuming it is on-hook) to operate the buzzer of that instrument. Upon the handset of the second telephone instrument being lifted, the microprocessor responds by interrupting the supply of signals to operate the buzzer and operates further relays of the relay matrix to connect the speech wires of the second instrument to said intercom speech highway. In an alternative arrangement, instead of pressing an extension key to identify the extension to which connection is required, the same effect can be achieved by dialling a single digit that characterises the wanted extension, a counting circuit which is associated with the microprocessor being arranged to respond to the number of impulses dialled.

Transfer of line call

If the user of a first one of the telephone instruments is engaged in a call via an exchange line, say Line 1, and wishes to transfer the call to a second one of said telephone instruments, he presses the "hold" button on the first instrument. This condition is recognised by the microprocessor which causes (1) a hold relay to operate so as to connect an appropriate resistance across the wires of Line 1, (2) release of the operated relays of said relay matrix to disconnect the speech wires of the first instrument from Line 1 and operates further relays of the matrix to connect those speech wires to the intercom highway, and (3) the supply of signals to flash the Line 1 lamps of all the telephone instruments at a hold frequency (which is different from the calling frequency). The appropriate intercom key of the first telephone instrument is then pressed to identify the telephone instrument to which the call is to be transferred and the microprocessor responds to that condition by causing the buzzer of the second instrument to operate and supplying ringing tone back to the first telephone instrument (via the intercom highway). When the second telephone instrument goes off-hook the microprocessor causes (1) the supply of ringing tone to the first instrument to be interrupted and (2) the appropriate relays of the relay matrix to be operated to connect the speech wires of the second instrument to the intercom highway so as to establish a speech connection between the first and second instrument. If the user of the second telephone instrument agrees to accept the call, he does so by pressing the Line 1 key of the second instrument with the result that, under the control of the microprocessor, (1) the appropriate relays of said matrix are operated to change over the connection of the speech wires of the second telephone instrument to the exchange line, (2) the Line 1 lamps of all the telephone instruments are lit continuously and (3) the hold relay is released.

Divert Calls

The microprocessor is pre-programmed so that all calls to a first one of the telephone instruments may automatically be transferred to a second telephone instrument. To bring this condition into operation, the divert key of the first instrument is pressed and the microprocessor responds by (1) examining a divert matrix (which contains information as to the pre-programmed diversions and which is part of said central unit) and writing the particular diversion into a storage location of the microprocessor, (2) operating a first divert lamp of the first telephone instrument to indicate that the extension is subject to diversion, and (3) operating a second divert lamp of the second telephone instrument to indicate that that extension has been nominated to receive diversion calls. The first and second diversion lamps are, of course, the two lamps associated with diversion calls to which brief reference had previously been made. The microprocessor deals with a subsequent incoming exchange line call in the manner previously described except that the buzzer of the first instrument is not operated. For an intercom call in which the first telephone instrument is being called, the microprocessor recognises that the call is to be diverted and causes the buzzer of the second telephone instrument to be operated and the divert lamp of that instrument to flash at the ringing cadence; upon the second instrument going off-hook, the buzzer of that instrument stops, the divert lamp of that instrument is extinguished and the appropriate relays of the said relay matrix are operated to establish the required speech connection via the intercom highway. The divert condition is removed by re-operation of the divert key of the first telephone instrument.

In the system so far described, each of the four telephone instruments is connected to the central unit by two pairs of wires and, in practise, all the telephone instruments and the central unit are located fairly close to one another, for example in the same building. It is sometimes required that one of the four "extensions" shall be located a considerable distance away from the central unit and be connected over only a single two-wire line. An example of this could be an extension is someone's house when the central unit and the remainder of the extensions are in an office building. The system under consideration has provision for this, with somewhat reduced facilities, as will now be described with reference to the accompanying drawing which shows diagrammatically the circuit of the additional unit required.

Referring now to the drawing, the central unit 10 is shown connected to the telephone instrument 11 of a typical internal extension by a pair of speech wires 12 and a pair of signalling wires 13 in the manner previously described. As far as the central unit 10 is concerned the external extension, in the form of a telephone instrument 14, looks like an internal extension and has connected to it a pair of speech conductors 15 and a pair of signalling conductors 16. The conductors 15 and 16 terminate however on an adaptor unit 17 which is located close to the central unit 10 and which is connected to the remote telephone instrument 14 by a pair of wires 18. The telephone instrument 14 is of a conventional type and has a dial 19 and a bell or other calling device (not shonw) but, unlike the instrument 11, has no keys or indicator lamps.

Operation of the adaptor unit 17 is controlled by a microprocessor 20 and the manner in which the unit handles various types of call will now be considered:

Intercom Call from External Extension

The call is initiated by the telephone instrument 14 going off-hook and dialling '0'. The effect of going off-hook is to loop the wires 18 and that condition is detected by a loop detector 21, contacts 22 of a relay 23 being closed at this time. Each dialled impulse is detected by the detector 21 and a signal is supplied thereby to the microprocessor 20 over a lead 24. The microprocessor 20 counts the number of such signals and upon a count of ten being reached (as a result of '0' having been dialled), the microprocessor 20 supplies a signal to a line driver/receiver 25 to cause a signal, corresponding to that supplied by an internal telephone to signal the off-hook condition, to be passed over the conductors 16 to the central unit. This results in the telephone instrument 14 being connected to the intercom highway via speech conductors 15 and operated relays of said matrix. The user of the telephone instrument 14 then dials a single digit characterising the wanted internal extension and that is responded to, as in the alternative arrangement previously described for established intercom calls between internal extensions, to connect the wanted extension to the intercom highway.

Exchange Call from External Extension

Afer going off-hook, the telephone instrument dials a single digit identifying the required exchange line (e.g. '1' for Line 1). As in the case just described, the microprocessor 20 counts the number of impulses detected by the loop detector 21 and causes the line driver/receiver 25 to supply to the conductors 16 a signal corresponding to that supplied by an internal extension as a result of the appropriate line key having been pressed. Accordingly the central unit 10 responds to the signal by connecting the speech conductors 15 through to the selected exchange line.

Incoming Exchange Line Call

As previously explained, this type of call results in the central unit supplying a signal over the control wires (for example the wires 13) of each extension identifying the exchange line involved. That signal thus appears on the wires 16 and, via the line driver/receiver 25, is detected by the microprocessor 20 which supplies signals over leads 26 and 27 respectively to operate a ringing generator 28 and cause the relay 23 to be actuated. Contacts 22 are therefore open at this time and the ringing signal supplied by the generator 28 is passed to the telephone instrument 19 over the wires 18. When the instrument 19 goes off-hook, the condition is detected by the loop detector 21 with the result that the microprocessor 20 causes the line driver/receiver 25 to apply to the control wires 16 a signal corresponding to the off-hook signal of an internal extension. It also gives a signal corresponding to operation of a line key (of an internal extension) in respect of the exchange line on which ringing was present. As in the case of an incoming exchange line call answered by an internal extension, that causes the central unit 10 to connect the appropriate exchange line to the wires 15 so as to complete the speech connection.

Intercom Call to External Extension

In this case again the microprocessor 20 detects a calling signal supplied by the central unit 10 over the conductors 16 and operates both the ringing generator 28 and the relay 23. When the telephone instrument 14 answers by going off-hook, that condition is detected by the loop detector 21 and the off-hook signal is supplied to the central unit 10 over the conductors 16 to cause the unit 10 to complete the required speech connection (via the conductors 15) to the instrument 14.

Although the telephone system described above by way of example has only four telephone instruments, it is to be understood that the present invention may be applied to systems involving a larger number of telephone instruments. In that case the central unit may have two or more intercom highways and, although the telephone instruments may have the same numbers of keys and indicator lamps as those previously described (so as to utilise the same number of two-way signalling channels between each telephone instrument and the central unit), the significance of each key and indicator lamp may be somewhat different.

Transfer call from External Extension

When an incoming exchange line call received by an external extension 14 is to be transferred a pushbutton contact 29 at the external instrument may be used to earth one of the pair of wires 18, and a conventional imbalance detector 30 in the adaptor unit 17 signals an exchange line hold to the central unit 10 by way of the microprocessor 20, freeing the external extension 14 to set up the transfer by an intercom call as described above.

We claim:
1. A telephone system of the kind which has at least three telephone instruments and provision for speech connections to be set up automatically by operation of manually operated controls associated with the telephone instruments between any of said instruments, and, selectively, either another of said instruments or a line to a remote exchange, said telephone system comprising
(A) a central unit to which said telephone instruments are connected each by only
  (I) a respective first pair of wires for carrying two-way speech signals and

(II) a respective second pair of wires for carrying control and indicating signals between the central unit and the telephone instrument, (B) the central unit being arranged to operate in response to control signals received over the second pair of wires to connect the first pair of wires to any one of the telephone instruments selectively to either an intercom highway or to an exchange line, (C) wherein to enable a further telephone instrument to be connected into the system over a single pair of wires and, at least for some facilities of the system, to emulate a telephone instrument having two pairs of connecting wires as aforesaid, (I) an adaptor unit is connected, adjacent the central unit, between the single pair of wires which are terminated by the further telephone instrument and first and second further pairs of wires which are connected to the central unit, (II) said first and second further pairs of wires corresponding to the previously mentioned first and second pairs of wires and being arranged respectively to carry speech signals and control signals, (a) said adaptor unit comprising loop detection means to supply an off-hook control signal to the second further pair of wires in response to the single pair of wires being looped when the further telephone instrument is off-hook and (b) means to supply a calling signal to the single pair of wires in response to the central unit supplying a signal over the second further pair of wires to signify that the further telephone instrument is to be called.

2. A system according to claim 1 and having more than one intercom highway so that a required speech connection between any two of the telephone instruments is set up when those instruments are connected to the same intercom highway.

3. A system according to claim 1 or claim 2 wherein the central unit is arranged to feed electric power to the telephone instruments via the first pairs of wires for the purpose of powering those instruments.

4. A system according to claim 1 or claim 2 wherein each of said telephone instruments has a calling device which responds to a control signal supplied by the central unit.

5. A system according to claim 1 wherein said further telephone instrument includes contact means to earth one of said single pair of wires at said instrument, and the adaptor unit includes means to signal the operation of said contact means to the central unit.

6. A system according to claim 5 wherein said contact means is operable to hold an incoming exchange call.

* * * * *